US012133036B2

(12) United States Patent
Gerhardt

(10) Patent No.: US 12,133,036 B2
(45) Date of Patent: Oct. 29, 2024

(54) PERSONAL HEARING DEVICE

(71) Applicant: Buderflys Technologies, Inc., Denver, CO (US)

(72) Inventor: Shea Gerhardt, Denver, CO (US)

( * ) Notice: Subject to any disclaimer, the term of this patent is extended or adjusted under 35 U.S.C. 154(b) by 24 days.

(21) Appl. No.: 17/734,782

(22) Filed: May 2, 2022

(65) Prior Publication Data

US 2022/0264213 A1 Aug. 18, 2022

Related U.S. Application Data

(62) Division of application No. 15/926,055, filed on Mar. 20, 2018, now Pat. No. 11,323,794.

(60) Provisional application No. 62/473,923, filed on Mar. 20, 2017.

(51) Int. Cl.
*H04R 1/10* (2006.01)
*H04R 25/00* (2006.01)

(52) U.S. Cl.
CPC ......... *H04R 1/1016* (2013.01); *H04R 25/652* (2013.01); *H04R 25/656* (2013.01); *H04R 1/1033* (2013.01); *H04R 1/1041* (2013.01); *H04R 1/1058* (2013.01); *H04R 25/65* (2013.01); *H04R 2201/10* (2013.01)

(58) Field of Classification Search
CPC ................ H04R 1/1016; H04R 25/652; H04R 25/656; H04R 1/1033; H04R 1/1041; H04R 1/1058; H04R 25/65; H04R 2201/10
USPC ........................... 381/189, 380, 374, 74, 384
See application file for complete search history.

(56) References Cited

U.S. PATENT DOCUMENTS

| | | | | |
|---|---|---|---|---|
| 3,394,277 | A | 7/1968 | Bruno et al. | |
| 4,006,796 | A | 2/1977 | Coehorst | |
| 4,031,449 | A | 6/1977 | Trombly | |
| 4,371,493 | A | 2/1983 | Minuto | |
| 4,397,055 | A | 8/1983 | Cuchiara | |
| 4,628,907 | A | 12/1986 | Epley | |
| 4,644,937 | A | 2/1987 | Hommann | |
| 4,856,118 | A | 8/1989 | Sapiejewski | |
| 5,002,151 | A | 3/1991 | Oliveira et al. | |
| 5,321,757 | A * | 6/1994 | Woodfill, Jr. ........ | H04R 25/659 381/328 |
| 5,321,865 | A | 6/1994 | Kaeser | |
| 5,613,259 | A | 3/1997 | Craft et al. | |
| 5,659,621 | A | 8/1997 | Newton | |
| 6,283,915 | B1 | 9/2001 | Aceti et al. | |
| 6,513,621 | B1 | 2/2003 | Deslauriers et al. | |
| 6,671,381 | B1 | 12/2003 | Lux-Wellenhof | |

(Continued)

FOREIGN PATENT DOCUMENTS

| | | |
|---|---|---|
| CN | 102848405 | 1/2013 |
| WO | WO 2018/049688 | 3/2018 |

OTHER PUBLICATIONS

US 9,883,272 B2, 01/2018, Chawan et al. (withdrawn)

(Continued)

*Primary Examiner* — Norman Yu
(74) *Attorney, Agent, or Firm* — Sheridan Ross P.C.

(57) ABSTRACT

Personal electronic devices are provided in the form of personal audio equipment. Devices of the present disclosure include readily-moldable ear inserts that are selectively formed to fit the shape of a user's ear and do not require heating, curing, setting, or other temperature manipulation. In some embodiments, the devices comprise wireless audio technology and wireless conductive charging.

20 Claims, 5 Drawing Sheets

(56) References Cited

U.S. PATENT DOCUMENTS

| | | | |
|---|---|---|---|
| 6,972,543 | B1 | 12/2005 | Wells |
| 7,151,839 | B2 | 12/2006 | Niederdrank |
| 7,778,424 | B2 | 8/2010 | Lange |
| 8,654,987 | B2 | 2/2014 | Palma |
| 8,774,444 | B2 | 7/2014 | Tiscareno et al. |
| 8,975,764 | B1 | 3/2015 | Abehasera |
| 9,167,336 | B2 | 10/2015 | Siahaan et al. |
| 9,277,309 | B2 | 3/2016 | Fino |
| 9,432,760 | B2 | 8/2016 | Iseberg et al. |
| 9,486,823 | B2 | 11/2016 | Andersen et al. |
| 9,532,131 | B2 | 12/2016 | Dusan et al. |
| 9,571,912 | B2 | 2/2017 | Siahaan et al. |
| 9,588,551 | B1 | 3/2017 | Hegde et al. |
| 9,699,546 | B2 | 7/2017 | Qian et al. |
| 9,735,595 | B2 | 8/2017 | Colahan et al. |
| 9,866,945 | B2 | 1/2018 | McAuliffe et al. |
| 9,883,583 | B2 | 1/2018 | Cousins et al. |
| 9,946,295 | B2 | 4/2018 | Smith et al. |
| 9,946,296 | B2 | 4/2018 | Smith et al. |
| 9,967,644 | B2 | 5/2018 | Chawan et al. |
| 9,973,845 | B2 | 5/2018 | Chawan et al. |
| 10,003,880 | B2 | 6/2018 | Wagman et al. |
| 10,003,881 | B2 | 6/2018 | Cousins et al. |
| 10,056,205 | B2 | 8/2018 | Hegde et al. |
| 10,116,167 | B2 | 10/2018 | Pomp-Melchers |
| 10,116,172 | B2 | 10/2018 | Fischer et al. |
| 10,154,460 | B1 | 12/2018 | Miller et al. |
| 10,170,918 | B2 | 1/2019 | Zadesky et al. |
| 10,225,637 | B2 | 3/2019 | Panecki et al. |
| 10,284,942 | B2 | 5/2019 | McAuliffe et al. |
| 10,303,209 | B2 | 5/2019 | Smith et al. |
| 10,362,670 | B2 | 7/2019 | Cousins et al. |
| 10,389,150 | B2 | 8/2019 | Colahan et al. |
| 10,397,682 | B2 | 8/2019 | Chawan et al. |
| 10,491,981 | B1 | 11/2019 | Wang et al. |
| 10,567,861 | B2 | 2/2020 | Rich et al. |
| 10,681,446 | B2 | 6/2020 | Chawan et al. |
| 10,785,553 | B2 | 9/2020 | Sang et al. |
| 10,796,863 | B2 | 10/2020 | Stringer et al. |
| 10,804,719 | B2 | 10/2020 | Colahan et al. |
| 10,827,252 | B2 | 11/2020 | Trainer et al. |
| 10,880,630 | B2 | 12/2020 | Chawan et al. |
| 10,904,652 | B2 | 1/2021 | Chawan et al. |
| 10,911,863 | B2 | 2/2021 | Trainer et al. |
| 10,944,156 | B2 | 3/2021 | Cousins et al. |
| 10,986,433 | B2 | 4/2021 | McIntosh et al. |
| 11,026,010 | B2 | 6/2021 | Chawan et al. |
| 11,026,011 | B2 | 6/2021 | Chawan et al. |
| 11,128,943 | B2 | 9/2021 | Hatfield et al. |
| 11,159,869 | B2 | 10/2021 | Grinker et al. |
| 11,206,472 | B2 | 12/2021 | Cousins et al. |
| 11,206,473 | B2 | 12/2021 | Ji et al. |
| 11,265,638 | B2 | 3/2022 | Trainer et al. |
| 11,323,794 | B2 | 5/2022 | Gerhardt |
| 2002/0085728 | A1 | 7/2002 | Shennib et al. |
| 2006/0147071 | A1 | 7/2006 | Neilson |
| 2007/0035917 | A1 | 2/2007 | Hotelling et al. |
| 2007/0201717 | A1 | 8/2007 | Dyer et al. |
| 2008/0013767 | A1 | 1/2008 | Olsen et al. |
| 2008/0187159 | A1 | 8/2008 | Blanchard |
| 2008/0240485 | A1 | 10/2008 | Dyer et al. |
| 2009/0060231 | A1 | 3/2009 | Buroojy |
| 2009/0103760 | A1 | 4/2009 | Stiehl et al. |
| 2009/0103764 | A1 | 4/2009 | Stiehl et al. |
| 2009/0123010 | A1 | 5/2009 | Cano et al. |
| 2009/0256361 | A1 | 10/2009 | Theuss et al. |
| 2009/0264044 | A1 | 10/2009 | Paculdo |
| 2009/0316944 | A1 | 12/2009 | Tiscareno et al. |
| 2010/0246879 | A1 | 9/2010 | Siahaan et al. |
| 2011/0170703 | A1 | 7/2011 | Palma |
| 2012/0082336 | A1 | 4/2012 | Wubker et al. |
| 2012/0300965 | A1 | 11/2012 | Samuels |
| 2013/0116015 | A1 | 5/2013 | Lee et al. |
| 2013/0238829 | A1 | 9/2013 | Laycock et al. |
| 2013/0251172 | A1 | 9/2013 | Mosseri |
| 2014/0146976 | A1 | 5/2014 | Rundle |
| 2014/0205124 | A1 | 7/2014 | Jensen et al. |
| 2014/0205131 | A1* | 7/2014 | Azmi .................. H04R 1/1066 381/380 |
| 2015/0060189 | A1 | 3/2015 | Iseberg et al. |
| 2016/0360350 | A1 | 12/2016 | Watson et al. |
| 2016/0381472 | A1 | 12/2016 | Feeley et al. |
| 2017/0134845 | A1 | 5/2017 | Milam et al. |
| 2017/0305040 | A1 | 10/2017 | Schreiner et al. |
| 2018/0212466 | A1 | 7/2018 | Schaefer et al. |
| 2019/0006882 | A1 | 1/2019 | Leem |
| 2019/0124431 | A1 | 4/2019 | Jeong et al. |
| 2020/0107106 | A1 | 4/2020 | Sang et al. |
| 2021/0152912 | A1 | 5/2021 | Chawan et al. |
| 2021/0211796 | A1 | 7/2021 | McIntosh et al. |
| 2021/0274273 | A1 | 9/2021 | Chawan et al. |
| 2022/0023446 | A1 | 1/2022 | Bartlett et al. |
| 2022/0200362 | A1 | 6/2022 | Mehrabi et al. |

OTHER PUBLICATIONS

US 9,883,281 B2, 01/2018, Chawan et al. (withdrawn)

U.S. Appl. No. 17/842,695, filed Jun. 16, 2022, Gerhardt.

Official Action for U.S. Appl. No. 17/842,695, dated Dec. 26, 2023, 12 pages.

"Comfortiered Silicone Plugs," Plugfones, 2018, retrieved from https://www.plugfones.com/product/comfortiered-silicone-plugs/, 5 pages.

"Comfortwist Foam Plugs," Plugfones, 2018, retrieved from https://www.plugfones.com/product/comfortwist-foam-plugs/, 4 pages.

"Frequently Asked Questions," Plugfones, 2018, retrieved from https://www.plugfones.com/faq/, 2 pages.

Ponte, "Shore Hardness and Soft TPEs," Teknorapex, Sep. 20, 2017, retrieved from https://www.teknorapex.comm/thermmoplastic-elastommers-and-measuring-shore-hardness-chart, 2 pages.

Official Action for U.S. Appl. No. 15/926,055, dated Mar. 5, 2019, 14 pages.

Official Action for U.S. Appl. No. 15/926,055, dated Jul. 23, 2019, 13 pages.

Official Action for U.S. Appl. No. 15/926,055, dated Jan. 6, 2020, 17 pages.

Official Action for U.S. Appl. No. 15/926,055, dated Nov. 9, 2020, 21 pages.

Official Action for U.S. Appl. No. 15/926,055, dated Jul. 28, 2021, 17 pages.

Notice of Allowance for U.S. Appl. No. 15/926,055, dated Jan. 27, 2022, 9 pages.

Corrected Notice of Allowance for U.S. Appl. No. 15/926,055, dated Mar. 8, 2022, 3 pages.

Corrected Notice of Allowance for U.S. Appl. No. 15/926,055, dated Mar. 23, 2022, 3 pages.

* cited by examiner

PERSONAL HEARING DEVICE

CROSS REFERENCE TO RELATED APPLICATION

This application is a divisional application of U.S. application Ser. No. 15/926,055, filed Mar. 20, 2018, which claims priority and benefits under 35 U.S.C. § 119(e) to U.S. Provisional Patent Application Ser. No. 62/473,923 filed on Mar. 20, 2017, the entire disclosures of which are incorporated herein in their entireties by reference.

FIELD

The present disclosure relates generally to systems, devices and methods for personal hearing equipment. More specifically, systems, devices and methods of the present disclosure relate to in-ear hearable devices, including headphones, earphones, headsets, hearing aid devices, hearables and earbuds. Devices of the present disclosure include an ear insert comprising a moldable member that does not cure or permanently set. Rather, the ear insert is custom moldable each time the ear insert is used or inserted into a user's ear. Other aspects of the invention include the use of the material in an ear insert, the integration of an ear insert with a hearable device, the electronics associated with the hearable device and the hearable device.

BACKGROUND

Personal audio equipment, including "earbuds" are favored for their portability and for their ability to provide a user with an audio signal without broadcasting the signal to the surrounding environment or other individuals. These devices have only become more popular with the increased prevalence of personal electronic devices including, but not limited to, smartphones. Existing personal audio equipment, however, suffers from various structural and ergonomic disadvantages. These disadvantages include, for example, hard plastic shells that are easily dislodged from a user's ear during activity, cold weather, etc. Various known devices intended to prevent unwanted dislocation of earbuds are known to be uncomfortable, unsightly, and heavy.

U.S. Pat. No. 4,006,796 to Coehorst, which is hereby incorporated by reference in its entirety, discloses an earpiece that takes the form of a pouch made from a plastic foil. The pouch is made with a thin-walled flexible capsule which is filled with a liquid medium. Since Coehorst discloses a liquid or jelly-like paste rather than a moldable material, it is susceptible to damage.

U.S. Pat. No. 4,856,118 to Sapiejewski, which is hereby incorporated by reference in its entirety, discloses a headphone cushion. Sapiejewski generally provides a device that extends around or over a user's ear and is not concerned with conforming to an inner portion of a person's outer ear.

U.S. Pat. No. 5,002,151 to Oliveira et al, which is hereby incorporated by reference in its entirety, discloses an ear piece comprising a user-disposable sleeve with a soft polymeric retarded recovery foam. Oliveira et al. fails to disclose or teach a material that is integrated with the ear piece and not disposable.

U.S. Pat. No. 6,513,621 to Deslauriers, which is incorporated by reference in its entirety, discloses an ear tip used in connection with a stethoscope. The ear tip is formed of a single piece of molded elastomeric material that includes a gelatin filled cavity. Deslauriers discloses a liquid gelatin material, which is susceptible to leakage or damage when punctured.

U.S. Pat. No. 8,654,987 to Palma, which is hereby incorporated by reference in its entirety, discloses a personal audio device with an earhook to prevent unwanted movement of the device. Palma, however, fails to disclose or contemplate a device that can be molded to each user's ear structure.

U.S. Pat. No. 9,167,336 to Siahaan et al. and U.S. Pat. No. 9,432,760, each of which are hereby incorporated by reference in their entirety, discloses a removable ear tip for use with a headphone.

Accordingly, there has been a long-felt and unmet need to provide personal hearing or audio equipment that fits securely and comfortable within at least a portion of a user's ear. There is also a need to provide a device that is moldable to a desired shape each time the device is used as it is never cured or hardened.

SUMMARY

It is therefore an object of the present disclosure to provide at least one hearable device that is comfortable, unobtrusive, and provide a custom fit for a particular human ear each time the earbud is used or inserted. The device can be an audio, hearable, or hearing aid device.

In various embodiments, ear inserts are provided with a moldable material that molds to the user's ear pocket (concha) each time it is used. Devices of the present disclosure unobtrusively fit within the confines of the ear pocket without becoming accidentally dislodged.

In various embodiments, devices of the present disclosure comprise audio features including, but not limited to, wireless speakers, Bluetooth® features, wired speakers, and similar features as will be recognized by one of ordinary skill in the art. U.S. Pat. No. 9,277,309 to Fino, and U.S. Publication No. 2016/0360350 to Watson et al., which are hereby incorporated by reference in its entirety, discloses various features related to wireless headphone technology. Various features of U.S. Pat. No. 9,277,309 are contemplated for use in embodiments of the present disclosure.

U.S. Pat. No. 9,532,131 to Dusan et al., which is hereby incorporated by reference in its entirety, discloses various features for earbud devices. Such features, including noise-cancelling features provided therein, are contemplated for use with embodiments of the present disclosure.

In certain embodiments, at least one ear insert is provided that comprises hardware (e.g. wiring and/or speaker(s)) surrounded by at least one malleable and/or moldable member and wherein the moldable member is operable to be custom fit to a user's ear structure. The member includes wax and/or silicone and is preferably moldable or deformable at room temperatures (i.e. between approximately 32 degrees F. and 100 degrees F.). In preferred embodiments, the ear insert(s) does not require the application of heat from a heat source to shape or mold portions of the ear insert to the ear concha or ear canal by the consumer.

In some embodiments, the first material can be malleable as defined herein. The malleable insert can be reshaped once the material has been used by one individual such that it is reshaped for a subsequent use by the same individual or by another individual. Advantageously, the first material can adjust to fit into the ear on subsequent uses. Malleable materials can include, but are not limited to, silicone, a polyurethane, a putty, a wax, and combinations thereof. In some embodiments, the malleable insert can also include a second material and the first material can exist over at least a portion of the second material.

In preferred embodiments, at least one ear insert is provided that comprises microelectronics surrounded by at least one moldable element. Devices and methods of use of such embodiments are devoid of a curing or hardening process, and are not expandable or elastic.

It is an object of the present disclosure to alleviate the pressure typically applied to a user's cartilage surrounding the concha or ear pocket, and in particular to the tragus and antitragus, that is associated with known, existing devices. It is also an object of the present disclosure to alleviate ergonomic issues and discomfort associated with known earbuds when worn with a hat or helmet, while resting or sleeping, during exercise, or with certain shapes of ears. It is yet another object of the present disclosure to provide ear inserts that can comprise a moldable element that provides comfort as well as waterproof or water-resistant characteristics and wherein electronics are surrounded by a moldable material, and the device(s) are thus operable to be used in a wet environment (e.g. a pool).

Advantageously, an aspect of the present invention incorporates the electronics of the device within the ear insert, but the electronics do not contact the concha of the user. The ear insert of the device also can be located within the ear or contours to the ear such that the ear insert of the device may not protrude from the ear. This configuration allows for the user to wear a helmet or other headgear which will not interfere with the ear insert. Another advantage of the invention is that a material of the ear insert is moldable, and remains in a moldable state. While some prior art devices are moldable, these devices are cured by the consumer to a permanently set state. The invention remains moldable every time it is used. As a result, the consumer does not need to heat, cool or perform another method to permanently set the material of the ear insert. Furthermore, the ear insert is not a tip. Some prior art devices include a pliable tip connected to or partially surrounding electronics of the rest of the device. The invention is not such a tip since tips are replaceable, but instead the whole ear insert, including the electronics, fit inside the ear concha. Other aspects of the invention can allow for a portion of the earbuds to be exterior to the concha, but the first material and at least a portion of the electronics are still integrated and are located within the ear during use.

In preferred embodiments, ear insert of the present disclosure comprise a moldable and deformable material that is not elastic. Preferred embodiments of the present disclosure comprise materials that are moldable (e.g. silicone, putty, and/or wax) and generally retain their shape after manipulation. Thus, in at least some embodiments, ear inserts are provided that comprise plasticity but not predominately elasticity.

As used herein, the term "hearable device" includes earphones, headphones, hearing aids, headsets, medical devices (i.e. a stethoscope), hearables (e.g. smart buds) or other devices used by a user to aid in hearing.

As used herein, the term "ear insert" relates to the portion of a device that contacts the concha of a user's ear.

As used herein, the terms "earbuds", "earphones", and "headphones" generally refer to personal audio devices designed to at least partially extend into a user's outer ear. These devices can, but need not, comprise additional support elements and structures that extend over a user's ear, or head or behind the user's neck.

As used herein, the term "moldable" means a material that is capable of being molded, and returns to an original shape. A material that is moldable is different from a material that is malleable. As used herein, "malleable" means that a material that is capable of being molded, but does not return to its original shape. As used herein, "pliable" means a material that is flexible without cracking.

In some embodiments, ear inserts of the present disclosure comprise a loop or grasping means to provide a user with a contact surface to grasp and manipulate the ear inserts. In further embodiments, a cord is provided to connect a pair of ear inserts.

Although various embodiments of the present disclosure contemplate the provision of a plurality of ear inserts, embodiments of the present disclosure are not limited to a plurality of devices. It will be recognized that inventive concepts lie within a single ear insert as shown and described in some embodiments. It is also specifically contemplated that a sole ear insert is provided in some embodiments of the present disclosure.

In certain embodiments, ear inserts of the present disclosure comprise wireless ear inserts having an on-board rechargeable battery. The rechargeable battery/batteries can be charged and recharged through conductive wireless charging. It is contemplated that a storage case for the ear inserts or a device integrating the ear inserts comprises a conductive wireless charger that can be plugged into an external power source to provide charging to the ear inserts. In some embodiments, the case or storage device can include control features including, for example, power and volume controls for the ear inserts. Furthermore, the hearable device can be integrated with a device for speaking (e.g. on a phone call, during a video chat, during a presentation, in a concert venue).

Devices of the present disclosure are contemplated as comprising one or more thermal set plastics (PPU, for example). At least one of a wax and silicone material is provided around electronic components of the device(s). A conduit or tube is contemplated as being provided through the wax or silicone material to provide a path of travel for air that is necessary to create noise from the speaker(s). The conduit or tube is also operable to receive sound, and devices of the present disclosure further contemplate the provision of a microphone such that the devices can be used as a voice receiver and/or recorder.

In one embodiment, a personal audio device is provided in the form of an ear insert. The device comprises electronic components including, but not limited to, a speaker and a power source operable to drive the speaker. The device further comprises a first material, wherein the first material substantially surrounds and encloses the speaker and the power source. In some embodiments, the first material comprises silicone. It is contemplated that the device may comprise a wireless device and wherein the device comprises at least one wireless receiver for receiving a signal.

An aspect of the invention is an ear insert. The ear insert includes at least one electronic component, and a first material. The first material surrounds at least a portion of the electronic component.

An aspect of the invention is an audio device. The audio device includes a hearable device, and one or two ear inserts that are attached to a first and second end of a cord. The ear inserts include at least one material, and at least one electronic component. The electronic component can include a speaker.

An aspect of the invention is method to make an ear insert. The electrical component can be in a housing. The housing can be at least partially coated with a first material. The first material can be partially cured at a first temperature. Exposure to the first temperature will not damage the electronic component.

In various embodiments, devices are provided that comprise at least one moldable member and which further comprise one or more pathways for the travel of air to and from a speaker. For example, in some embodiments, a conduit is provided that extends between electrical components of an ear insert and an outer region of a moldable member. The conduit can comprise, for example, an at least partially rigid tube. The conduit can comprise one or more plastic materials. Conduits of the present disclosure can be interconnected to additional structure to prevent against the risk of moldable materials covering a speaker or speaker outlet and thereby muffling sound.

The Summary of the Invention is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more readily apparent from the Detailed Description, particularly when taken together with the drawings.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosure.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

Figure 1:
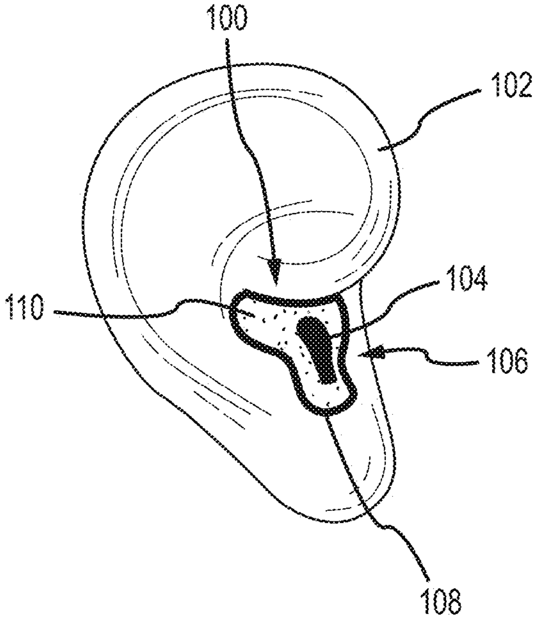
Figure 2:
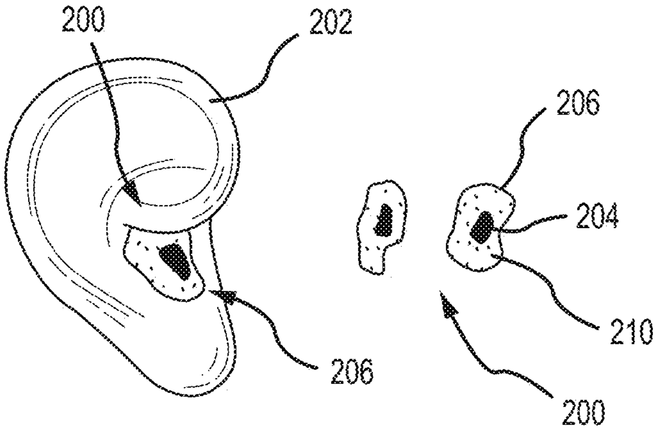
Figure 3:
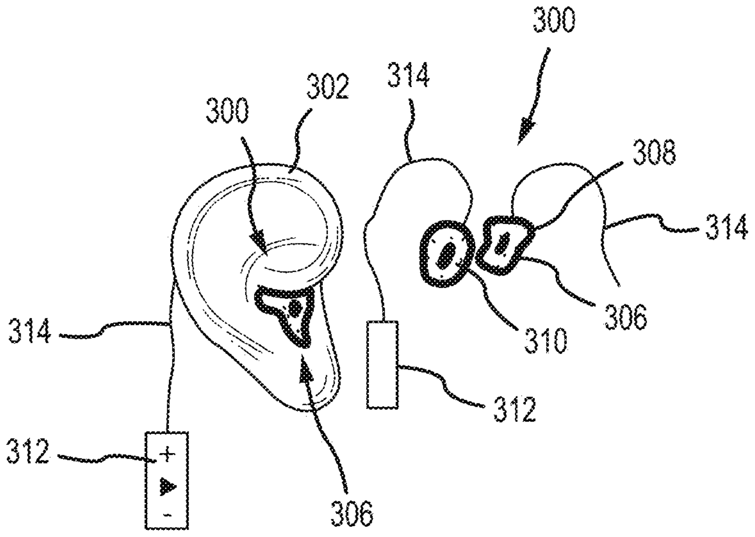
Figure 4:
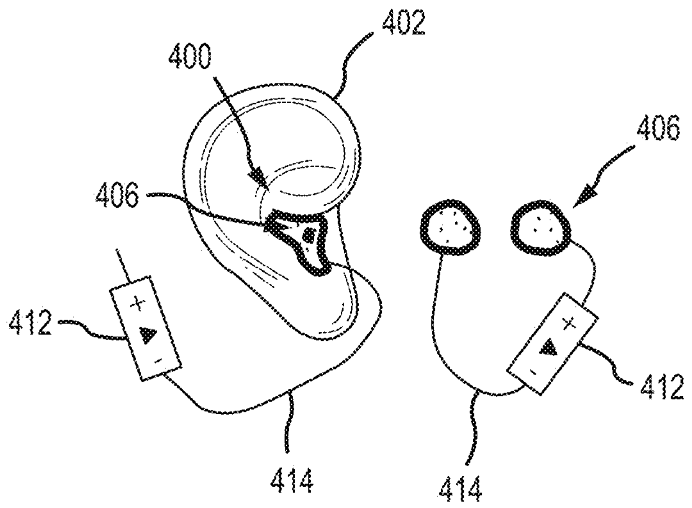
Figure 5:
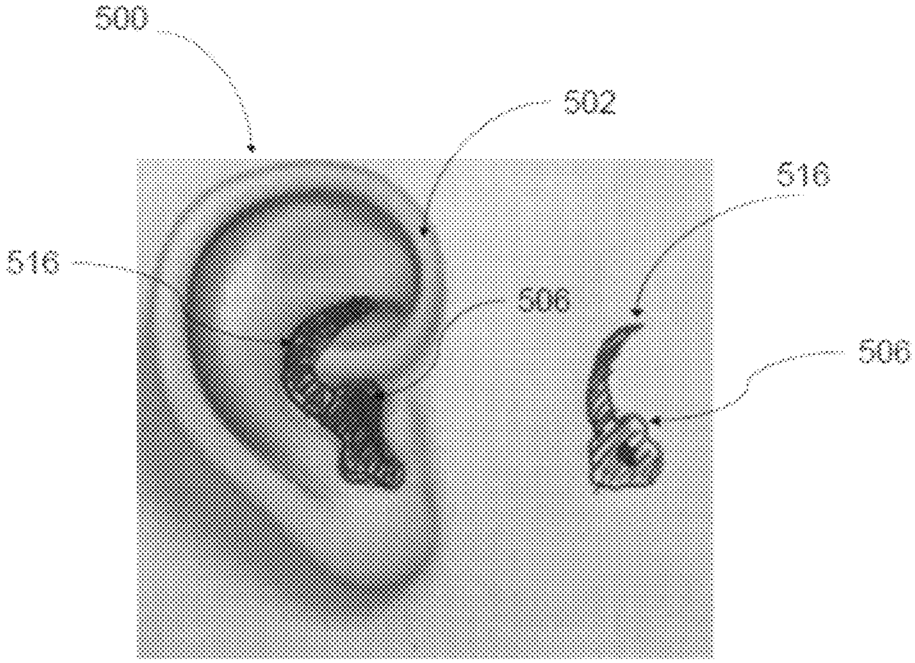
Figure 6:
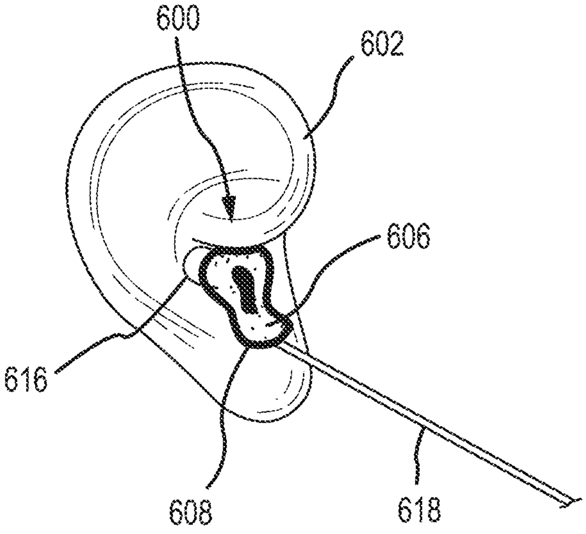
Figure 7:
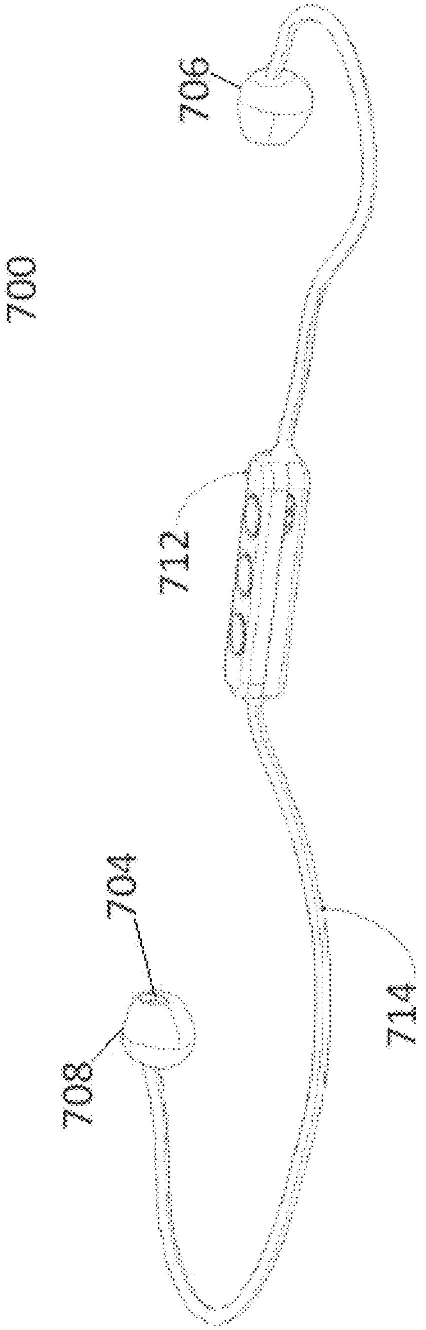
Figure 8:
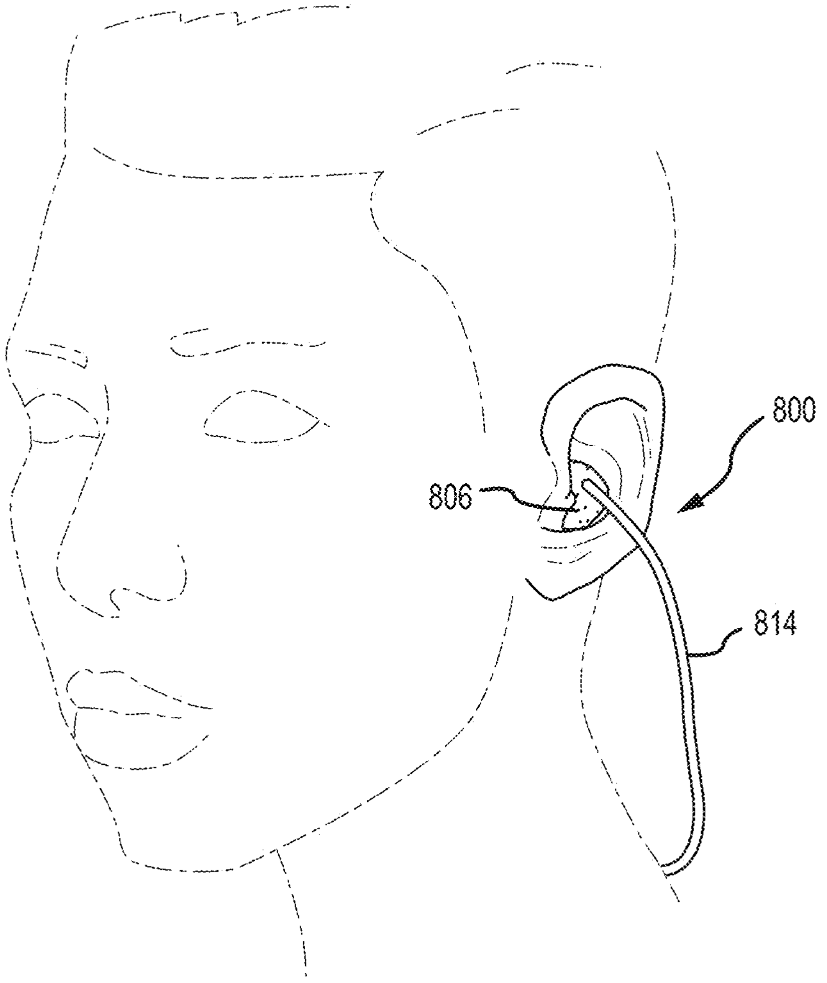

FIG. 1 illustrates a perspective view of ear insert devices according to one embodiment of the present disclosure provided relative to a human ear;

FIG. 2 illustrates a perspective view of ear insert devices according to one embodiment of the present disclosure provided relative to a human ear;

FIG. 3 illustrates a perspective view of ear insert devices according to one embodiment of the present disclosure provided relative to a human ear;

FIG. 4 illustrates a perspective view of ear insert devices according to one embodiment of the present disclosure provided relative to a human ear;

FIG. 5 illustrates a perspective view of ear insert devices according to one embodiment of the present disclosure provided relative to a human ear;

FIG. 6 illustrates a perspective view of ear insert devices according to one embodiment of the present disclosure provided relative to a human ear;

FIG. 7 illustrates a perspective view of an ear device of the invention; and FIG. 8 illustrates a user with a device comprising the ear insert

DETAILED DESCRIPTION

The invention relates to an ear insert, a method of making the ear insert, material used with the ear insert, and a method of using the ear insert. The ear insert can be used in any hearable device, including a hearing aid, an audio device, or a stethoscope for example. While the material can advantageously be used to surround the electronics used with the device, in some embodiments, the material can be incorporated into other hearable devices where the electronics may not be required, for example in a stethoscope. The material is sufficiently adhered to the electronics such that the material will not easily separate from the electronics. The moldable material can be formed to an ear for each use. Thus, there is no "correct" way of putting the ear insert into the ear.

An advantage of the present invention is that the microelectronics associated with the ear insert is incorporated into the ear insert and therefore resides within the concha rather than in a hard material outside of the concha. As a result, the microelectronics are small enough to fit within the concha while still allowing room in the concha for a moldable material to surround the electronics. Because the ear insert resides within the concha, it may not protrude from the ear causing discomfort to the user when a helmet or other head device contacts the ear. The ear insert also does not interfere with the hair of the user, stain skin or clothing. Furthermore, because the material of the ear insert is moldable, it can conform and be noise isolating, thereby reducing exterior noise from interfering with a user's experience and also blocks others in proximity to the user from hearing the audio emitting from the user's ear inserts.

The electronic components can be at least partially encased in a housing unit. The housing unit can be integrated with an air tube. In some embodiments, the material of the housing until can be a metal, plastic or polymer, or combinations thereof.

The material that surrounds the electronics of the ear insert remains in a moldable state, in other words, it does not permanently set. Thus, it does not require the consumer to heat, cool, or otherwise subject the material to a process to permanently set the material. The use of temperature changes, both hot and cold, are not preferred because of the potential to damage the electronic components within the ear insert. The material used in the ear insert is durable and capable of heavy use (e.g. at least about 100 uses, at least 10,000 uses, or a product use of at least about 4 months, or at least about 6 months of use) without catastrophic damage to the ear insert. The battery associated with the ear insert can provide at least about 6 hours of use without recharging. The audio quality is as good as other comparable earbuds on the market. Another advantage of the invention is that it can include other electronics, which can be exterior to the concha, that allows the user to answer calls, end calls, adjust the volume, adjust the treble, adjust the base, or perform a combination of these functions.

An aspect of the invention is an ear insert. The ear insert includes at least one electronic component and a first material. The first material surrounds at least a portion of the electronic component. In some embodiments, the first material surrounds between about 40% and about 99% of the electronic component. In some embodiments, the first material surrounds between about 50 and about 99%, between about 60 and about 95%, between about 75 and about 90%, or at least about 90% of the electronic component. In some embodiments, the first material surrounds about 40% of the electronic component, about 45% of the electronic component, about 50% of the electronic component, about 55% of the electronic component, about 60% of the electronic component, about 65% of the electronic component, about 70% of the electronic component, about 75% of the electronic component, about 80% of the electronic component, about 85% of the electronic component, about 90% of the electronic component, about 92% of the electronic component, about 94% of the electronic component, about 95% of the electronic component, about 96% of the electronic component, about 98% of the electronic component, or about 99% of the electronic component.

In some embodiments, the electronic component can include at least one of the speaker and the power source. The power source can supply the power to the speaker and other components, including components that control, wiring, circuitry, wireless features, or adjust the sound. A portion of the electronics (for example between about 0.5% and about 90% of the area) can be exposed to air. The power source can be charged using a device, such as a box, a plate, or a plug. The ear insert can include a wireless receiver. In some embodiments, the wireless receiver can be incorporated in the electronic component. The ear insert can include a wireless control. In some embodiments, the wireless control can work with the electronic component. A control box can be integrated with a secondary device, for example a computer, a phone, a tablet, a watch, a case, or other device, that can be used to control a component of the ear insert. The control box can communicate with the wireless receiver using wireless technology, including but not limited to Bluetooth™.

The first material can be a moldable material. In some embodiments, the first material can be a malleable material. In some embodiments, the first material can have a Shore 00 durometer of between about 1 and about 100. In some embodiments, the Shore 00 hardness can be between about 30 and about 100, between about 40 and about 60, between about 50 and about 70. In some embodiments, the Shore 00 can be about 1, about 5, about 10, about 15, about 20, about 25, about 30, about 35, about 40, about 45, about 50, about 55, about 60, about 65, about 70, about 75, about 80, about 85, about 90, about 95, or about 100. In some embodiments, the first material can be at least one of a silicone, a urethane, a foam, a putty, a wax, a polymer thereof, or a derivative thereof. In some embodiments, the first material can be at least one of a silicon, a urethane, a putty, a way, a polymer thereof, or a derivative thereof. Putty materials for use with embodiments of the present disclosure include, but are not limited to, those described in U.S. Pat. No. 4,371,493 to Minuto, which is hereby incorporated by reference in its entirety. The first material can be porous. In some embodiments, the first material can be silicone. The silicone can be used with a primer, or without a primer without deviating from the invention. The first material can be compatible with human skin, and does not stain skin or clothing. Furthermore, the first material is not disposable. Rather, it is intended to be permanently integrated with the ear inert.

A second material can be used with the ear insert. The first material can be over the second material. In some embodiments, the second material can be connected to the first material. The second material can be different from the first material. The first material can be breathable, and not be susceptible to picking up lint or hair. The second material is not required in all embodiments. In some embodiments, the second material can be a silicone, a urethane, a rubber, a wax, a plastic, a thermal set plastic, a polymer thereof, a derivative thereof, or combinations thereof. The second material can be malleable and compatible with human skin. In some embodiments, the second material can attach to the electronic component. The second material can attach to the speaker. In some embodiments, the second material can have a Shore 00 durometer of between about 30 and about 100. In some embodiments, the Shore 00 hardness can be between about 40 and about 90, between about 50 and about 80, between about 60 and about 70. In some embodiments, the Shore 00 can be about 30, about 35, about 40, about 45, about 50, about 55, about 60, about 65, about 70, about 75, about 80, about 85, about 90, about 95, or about 100. A total length of the ear insert can be between about 0.4 inches and about 1.2 inches. In some embodiments, the total length of the ear insert can be between about 0.4 inches and about 1.0 inches, between about 0.5 inches and about 0.75 inches, between about 0.6 inches and about 0.65 inches. In some embodiments, the length of the insert can be about 0.4 inches, about 0.45 inches, about 0.5 inches, about 0.55 inches, about 0.6 inches, about 0.65 inches, about 0.7 inches, about 0.75 inches, about 0.8 inches, about 0.85 inches, about 0.9 inches, about 0.95 inches, about 1.0 inches, about 1.05 inches, about 1.1 inches, about 1.15 inches, or about 1.2 inches.

In some embodiments, the ear insert can be incorporated with an earbud, a headphone, earphones, a hearing aid, or a hearable device. The ear insert can be incorporated such that it sits within the concha, while allowing other portions to be located outside the concha. Other portions can include a microphone for voice transmission, wireless technology, battery, or electronics for operating the microphone by way of example. The other portions can be attached to a wire or a cord but can also be truly wireless. For example, a microphone can be attached to a wire or cord. The wire can come from the ear insert or can be connected to another component that can be integrated with the ear insert.

In some embodiments, the ear insert can include at least one air tube. An air tube can allow air to reach the electronic component. The air tube can be a stiff material, semi rigid, or a softer material. The air tube can be formed in the first material. The air tube can have a first end and a second end. The first end of the air tube can connect with the electronic component, while the second end of the air tube can be open. The first material does not cover at least a portion of the area of the second end of the tube. In some embodiments, the first material does not cover an area of more than about 50% of the second end of the air tube. In some embodiments the first material does not cover the second end of the air tube. In some embodiments, the second material does not cover an area of more than about 50% of the second end of the air tube.

The ear insert can include a device remover portion to remove the ear insert from the ear. The device remover portion can be a loop, a grabber, a tab, or a combination thereof. The device remover portion can be integrated to the ear insert. A material of the device remover portion can be a metal, a plastic, a silicone, the first material, the second material, and combinations thereof.

The ear insert can include a cord. The cord can include a wire to transmit electrical signal to the electronic component. A control box can be integrated with the cord to control the electronic component.

In some embodiments, the ear insert can further include multiple layers of the secondary material. Each layer of the secondary material can be the same material as other layers, or can be different. In some embodiments, the extra layers of the secondary material can be used to assist in sizing the ear insert. By way of example, a person with a larger ear concha may require a thicker ear insert to fit, while someone with a smaller concha may not require additional layers of the secondary material. In some embodiments, the thickness of the ear insert can be achieved by increasing the thickness of the first material, the second moldable material, or both the first material and the second moldable material. Like the secondary material, multiple layers of the first material can be used without deviating from the invention and each layer can be the same material as another layer within the insert.

The ear inserts can be sized for a particular class of individuals. For example, the ear inserts can be made for children, adults with small sized concha, medium sized concha or large sized concha without deviating from the invention.

An aspect of the invention is an audio device. The audio device can be the ear insert, or can incorporate the ear insert to produce the audio device. For example, the audio device can include a microphone or a control box, along with the ear insert. The microphone can be on a wire that connects a first end of the audio device to a second end of the audio device. An ear insert can be located on the first end of the audio device, the second end of the audio device, or both the first and second end of the audio device. A control box can be located on the wire or can be on a secondary device such as a phone, tablet, computer, etc. The control box can control at least the volume of the audio device, but one skilled in the art would also understand that the control box can control other aspects, including the power, whether a call is answered or ended, pausing or unpausing an audio or video file, fast forwarding or rewinding an audio or video file, and the like. While the ear insert can reside in the concha, other portions of the audio device can be present outside the concha. In some embodiments, at least a portion of the audio device can protrude from the ear without deviating from the invention.

An aspect of the invention is a hearing aid. The hearing aid can include the ear insert, where the electric components are utilized to assist in hearing. Multiple different in ear configurations of hearing aids can be used with the present invention. Without intention of being limited to an embodiment, suitable configurations of hearing aids include but are not limited to those described in U.S. Pat. No. 7,151,839, or 5,659,621, or U.S. Publication No. 2008/0013767, which are each incorporated by reference in their entirety.

An aspect of the invention is a method to make the ear insert. The first material is provided to at least a portion of the electronic component or electronic component housing. The first material can then be fully cured or partially cured. One skilled in the art would understand that the first material can be selected such that the curing temperature of the first material does not exceed the high temperature allowed for use with the electronic components. If used, the secondary material can be applied to the first material. The first material and/or second material can then be fully cured at a suitable temperature for the selected material. The ear insert can be incorporated with other parts to form the final product (e.g. hearables, hearing devices, stethoscope, etc.) To be clear, the first material and/or second material can be cured during the manufacturing process, but is not heated to mold the ear insert by the consumer.

An aspect of the invention is a method to incorporate the ear insert with an existing hearable device. The ear inserts comprising at least the electronic components and the first material, can be incorporated with other components to make a hearable device.

An aspect of the invention is an ear bud that protrudes from the ear and includes a first material and electrical components. The electrical component is at least partially covered with the first material. In some embodiments, the first materials can be at least partially coated with the secondary material. The first material with the electrical components can reside in the concha during use, while other portions of the ear bud can protrude from the ear.

FIG. 1 illustrates an ear device 100 in an ear 102 according to an embodiment of the present disclosure. As illustrated, electrical components 104 are provided within and surrounded by a first material 110. The first material 110 and the secondary material 108 surround and enclose electrical components 104 to form the ear insert 106. Various existing headphone hardware, including that which is disclosed and incorporated by reference herein, may be provided within at least one of the first material and the secondary material.

As further illustrated in FIG. 1, at least one of the first material 110 and the secondary material 108 is selectively moldable and formable to be custom-fit within the ear 102 of a user. The ear insert 106 does not require the application of heat or other labor-intensive molding operations. Rather, the ear insert 106 can be shaped by a user at room temperatures to obtain a desired shape.

FIG. 2 illustrates a perspective view of an ear device 200 in an ear 202 according to an embodiment of the present disclosure. As illustrated in FIG. 2, the ear insert 206 comprise electronics 204 nested within a first material 210 and is located within the concha of the ear 202.

FIG. 3 illustrates a perspective view of an ear device 300 in an ear 302 according to an embodiment of the present disclosure. The ear devices 300 of FIG. 3 can include the structures illustrated and described with respect to FIG. 1 or FIG. 2. The devices of FIG. 3 further include a cord 314 and an interconnected control member 312. The control member 312 can operate to allow a user to control at least one of a power and a volume supplied to the ear insert 306. In certain embodiments, the control member 312 comprises a power source (e.g., rechargeable lithium ion battery). Although various embodiments of the present disclosure contemplate wireless capabilities (i.e., wherein the ear insert is not directed connected or “plugged-in” to an external device), the present disclosure is not limited to such embodiments. It is contemplated that features and devices of the present disclosure including ear inserts with at least one moldable material are provided as wired devices, wherein the ear inserts include a cord or capable that is connectable to various preexisting devices (e.g., smartphones, computers, music players, etc.). The ear insert 306 has a first material 310 and a secondary material 308.

FIG. 4 illustrates a perspective view of an ear device 400 comprising ear inserts 406 of another embodiment of the present disclosure. The devices 400 of FIG. 4 can comprise the structures illustrated and described with respect to FIG. 1, FIG. 2, or FIG. 3. The devices 400 of FIG. 4 can include a cord 414 and a control member 412. The cord of the embodiment of FIG. 4 is provided as a connection between two ear inserts 406 and serves as a tether between the two ear inserts 406 to form an ear device 400. Various devices, including those illustrated in FIGS. 3-4, for example, comprise a cord 414 but are generally considered “wireless” devices as they further comprise wireless functionality (e.g., Bluetooth® functionality) to connect to and communicate with an additional device. But to be clear, the cord 414 is not necessary.

FIG. 5 illustrates a perspective view of ear inserts with an extension 500 of an embodiment of the present disclosure. As illustrated in FIG. 5, the ear inserts 506 comprise electrical components, a first member, and a secondary member. The first member and the secondary member are formed or shaped in a desired manner to fit securely within a user's ear 502. The ear insert 506 comprises an extension 516 that is operable to fit within and contact a user's concha (cymba).

FIG. 6 illustrates a perspective view of an ear device 600 of another embodiment of the present disclosure. As illustrated in FIG. 6, the ear insert 606 comprise electrical components, a first member, and a secondary member. The ear inserts 606 of FIG. 6 also includes a device remover portion in the form of a conduit 616. The conduit 616 is provided in the form of a loop, which provides a user with a means for grasping the ear insert 606 to be removed (for example) from the ear 602. A microphone or voice transmitter 618 can be attached and extend from the ear insert 606. The device remover portion or conduit can also be used to transmit air or pressure and to allow ambient air to be conveyed to a speaker of the ear insert. As one of ordinary skill in the art will recognize, the speaker(s) of the ear insert requires a quantity or volume of air to move to create soundwaves and function as an audio device. Thus, in various embodiments, a conduit or tube is provided as a channel or pathway to convey ambient air to a speaker portion disposed within a first material and/or a secondary material. The conduit of FIG. 6 comprises an at least partially rigid including, for example, rubber or plastic.

FIG. 7 illustrates an ear device 700 according to embodiments of the invention. The device includes a cord 714 and a control panel 712. The inserts 706 can be located on either end of the cord 714. The electrical components 704 can be surrounded by a second material 706, which can be surrounded by a first material 708.

FIG. 8 illustrates an ear device 800 according to embodiments of the invention. The ear device comprises an insert 806 (shown in the user's ear) and a cord 814 extending from the insert 806.

Various features and embodiments of pressure washing devices are provided herein. It will be recognized, however, that various features are not necessarily specific to certain embodiments and may be provided on any one or more embodiments. The present disclosure and embodiments provided herein are not mutually exclusive and may be combined, substituted, and omitted. The scope of the invention(s) provided herein is thus not limited to any particular embodiment, drawing, or particular arrangement of features.

While various embodiments of the present disclosure have been described in detail, it is apparent that modifications and alterations of those embodiments will occur to those skilled in the art. However, it is to be expressly understood that such modifications and alterations are within the scope and spirit of the present disclosure. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

Ranges have been discussed and used within the forgoing description. One skilled in the art would understand that any sub-range within the stated range would be suitable, as would any number within the broad range, without deviating from the invention.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method to make a hearable device, comprising:

providing at least one electrical component, wherein the at least one electrical component is in a housing;

providing an ear insert by at least partially coating the housing with a first material; and during a manufacturing process of the ear insert, curing the first material at a temperature that will not damage the at least one electrical component to produce the ear insert, wherein the first material remains in a moldable state after the manufacturing process.

2. The method of claim 1, wherein at least a portion of the ear insert flexes or moves in conjunction with movement of a human ear while inserted.

3. The method of claim 1, wherein at least a portion of the first material contacts an ear of a user.

4. The method of claim 1, wherein the ear insert is part of an in-ear wearable, headphone, earphone, or hearable device.

5. The method of claim 1, wherein a nature of the first material alleviates pressure to a user's cartilage surrounding a concha or ear pocket, and in particular to a tragus and antitragus.

6. The method of claim 1, wherein the first material softens in warmer temperatures, which enhances a frictionless experience while inserted.

7. The method of claim 1, further comprising:

a second material, wherein the first material covers the second material, and wherein the at least one electrical component at least partially fits into a space or cavity provided by the second material.

8. The method of claim 1, wherein the ear insert is not detachable from the at least one electrical component.

9. The method of claim 7, wherein the second material at least partially surrounds the at least one electrical component, and wherein the first material is adhered to the second material.

10. The method of claim 1, wherein the first material is readily moldable, which allows for a reduction in friction compared to a ridged or hard material(s).

11. The method of claim 1, wherein the at least one electrical component includes at least one of a rechargeable battery, microphone(s), microchip, processors, monitors, drivers, balancer, speakers, cable connecting system, central processing units, sensors, and/or other smart technologies components that may include an internet protocol (IP) address for the hearable device.

12. The method of claim 1, further comprising:

a second material, wherein the first material covers the second material, wherein the second material is different from the first material, and wherein the first material is breathable.

13. A hearable device, comprising:

a housing;

at least one electrical component, wherein the at least one electrical component is in the housing; and an ear insert, wherein the ear insert is formed by at least partially coating the housing with a first material, wherein during a manufacturing prosses the first material is cured at a temperature that will not damage the at least one electrical component, and wherein the first material remains in a moldable state after a manufacturing process.

14. The hearable device of claim 13, wherein at least a portion of the ear insert flexes or moves in conjunction with movement of a human ear while inserted.

15. The hearable device of claim 13, wherein a nature of the first material alleviates pressure to a user's cartilage surrounding a concha or ear pocket, and in particular to a tragus and antitragus.

16. The hearable device of claim 13, wherein the first material softens as it warms which enhances a frictionless experience while inserted.

17. The hearable device of claim 13, wherein the first material is readily moldable, which allows for a reduction in friction compared to a ridged or hard material(s).

18. The hearable device of claim 13, wherein the at least one electrical component includes at least one of a rechargeable battery, microphone(s), microchip, processors, monitors, drivers, balancer, speakers, cable connecting system, central processing units, sensors, and/or other smart technologies components that may include an internet protocol (IP) address for the hearable device.

19. The hearable device of claim 13, further comprising:

a second material, wherein the first material covers the second material, and wherein the at least one electrical component at least partially fits into a space or cavity provided by the second material.

20. The hearable device of claim 19, wherein the second material is different from the first material.

* * * * *